(12) United States Patent
Dolan et al.

(10) Patent No.: US 10,157,509 B2
(45) Date of Patent: Dec. 18, 2018

(54) SYSTEM FOR PUBLIC TRANSIT INCIDENT RATE ANALYSIS AND DISPLAY

(71) Applicant: Conduent Business Services, LLC, Florham Park, NJ (US)

(72) Inventors: Bryan R. Dolan, Webster, NY (US); John C. Handley, Fairport, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 114 days.

(21) Appl. No.: 15/392,714

(22) Filed: Dec. 28, 2016

(65) Prior Publication Data

US 2018/0182181 A1    Jun. 28, 2018

(51) Int. Cl.
| | |
|---|---|
| *G07C 5/00* | (2006.01) |
| *G08G 1/123* | (2006.01) |
| *G06T 11/60* | (2006.01) |
| *G06T 11/00* | (2006.01) |
| *G08G 1/127* | (2006.01) |
| *H04N 7/18* | (2006.01) |

(52) U.S. Cl.
CPC ............ *G07C 5/008* (2013.01); *G06T 11/001* (2013.01); *G06T 11/60* (2013.01); *G08G 1/127* (2013.01); *H04N 7/181* (2013.01)

(58) Field of Classification Search
CPC ........ G07C 5/008; H04N 7/181; G08G 1/127; G08G 1/0129; G08G 1/0137; G08G 1/0141; G08G 1/123; G08G 1/13; G08G 1/133; G08G 1/137; G06T 11/60; G06T 11/001; G06Q 10/0631; G06Q 10/06311; G06Q 10/0639; G06Q 10/06393
See application file for complete search history.

(56) References Cited

U.S. PATENT DOCUMENTS

| | | |
|---|---|---|
| 4,791,571 A | 12/1988 | Takahashi et al. |
| 5,122,959 A | 6/1992 | Nathanson et al. |
| 6,006,159 A | 12/1999 | Schmier et al. |

(Continued)

OTHER PUBLICATIONS

Atkins et al., "Re-thinking how family researchers model infrequent outcomes: A tutorial on count regression and zero-inflated models", to be published as (copyright American Psychological Association), Journal of Family Psychology, (2007) 33 pages.

(Continued)

*Primary Examiner* — Adam R Mott
(74) *Attorney, Agent, or Firm* — Fox Rothschild LLP

(57) ABSTRACT

An incident management system in a public transit network receives incident data collected by one or more sensors of the transit network, segments a display screen into multiple cells so that each of the cells corresponds a route segment and a time segment in which one or more vehicles in the transit network traveled, and outputs a graphical representation for each cell. The sensors may be installed on a vehicle to detect various types of incidents such as disturbance, safety and mechanical issues, or any incidents external to the vehicle. The graphical representation may be indicative of the estimated future incident rate for the route segment and the time segment to which each cell corresponds, and displayed by a color scale in a heatmap. The system may estimate the incident rate using a linear model that can be obtained in a training process.

23 Claims, 7 Drawing Sheets

(56) References Cited

U.S. PATENT DOCUMENTS

| | | | |
|---|---|---|---|
| 6,317,686 B1 | 11/2001 | Ran | |
| 6,486,801 B1 | 11/2002 | Jones | |
| 6,492,912 B1 | 12/2002 | Jones | |
| 6,618,668 B1 | 9/2003 | Laird | |
| 6,683,542 B1 | 1/2004 | Jones | |
| 6,952,645 B1 | 10/2005 | Jones | |
| 7,030,781 B2 | 4/2006 | Jones | |
| 7,546,206 B1 | 6/2009 | Miller et al. | |
| 7,720,630 B1 | 5/2010 | Miller et al. | |
| 8,275,540 B2* | 9/2012 | Downs | G08G 1/0104 340/995.13 |
| 8,352,298 B2 | 1/2013 | Handley et al. | |
| 8,573,366 B2 | 11/2013 | Elomaa et al. | |
| 8,761,975 B2 | 6/2014 | Watson | |
| 8,832,001 B2* | 9/2014 | Handley | G08G 1/0112 706/11 |
| 9,159,032 B1* | 10/2015 | Tripathi | G06N 5/048 |
| 2003/0135304 A1 | 7/2003 | Sroub et al. | |
| 2003/0236598 A1 | 12/2003 | Villarreal Antelo et al. | |
| 2005/0216331 A1 | 9/2005 | Ahrens et al. | |
| 2006/0089812 A1 | 4/2006 | Jacquez | |
| 2006/0184670 A1 | 8/2006 | Beeson et al. | |
| 2006/0235739 A1 | 10/2006 | Levis et al. | |
| 2007/0106550 A1 | 5/2007 | Umblijs et al. | |
| 2007/0173993 A1 | 7/2007 | Nielsen et al. | |
| 2008/0147473 A1 | 6/2008 | Zhong et al. | |
| 2008/0243328 A1 | 10/2008 | Yu et al. | |
| 2008/0319829 A1 | 12/2008 | Hunt et al. | |
| 2010/0036728 A1 | 2/2010 | Pechenick et al. | |
| 2010/0088146 A1 | 4/2010 | Zhong et al. | |
| 2010/0125487 A1 | 5/2010 | Sinclair et al. | |
| 2010/0185486 A1 | 7/2010 | Barker et al. | |
| 2010/0280881 A1 | 11/2010 | Faith et al. | |
| 2010/0299177 A1 | 11/2010 | Buczkowski et al. | |
| 2011/0161138 A1 | 6/2011 | Keaveny et al. | |
| 2012/0090922 A1 | 4/2012 | Elomaa et al. | |
| 2012/0173530 A1* | 7/2012 | Kurciska | G06F 17/30241 707/738 |
| 2012/0310707 A1 | 12/2012 | Naphade et al. | |
| 2013/0024249 A1 | 1/2013 | Zohar et al. | |
| 2013/0046526 A1 | 2/2013 | Yucel et al. | |
| 2013/0046586 A1 | 2/2013 | Lerner et al. | |
| 2013/0096815 A1 | 4/2013 | Mason et al. | |
| 2013/0159826 A1 | 6/2013 | Mason et al. | |
| 2013/0164715 A1 | 6/2013 | Hunt et al. | |
| 2013/0176401 A1 | 7/2013 | Monari et al. | |
| 2013/0245884 A1 | 9/2013 | Forutanpour et al. | |
| 2013/0311076 A1* | 11/2013 | Mieth | G01C 21/32 701/119 |
| 2013/0317884 A1 | 11/2013 | Chidlovskii | |
| 2013/0339266 A1 | 12/2013 | Looman et al. | |
| 2013/0339341 A1 | 12/2013 | Fan et al. | |
| 2013/0344802 A1 | 12/2013 | Armour et al. | |
| 2014/0019177 A1 | 1/2014 | Smith | |
| 2014/0039986 A1 | 2/2014 | Handley | |
| 2014/0200805 A1 | 7/2014 | Modica et al. | |
| 2014/0278086 A1 | 9/2014 | San Filippo et al. | |
| 2014/0372017 A1* | 12/2014 | Armitage | B60W 40/09 701/117 |
| 2015/0032490 A1 | 1/2015 | Handley | |
| 2015/0160024 A1* | 6/2015 | Fowe | G01C 21/34 701/400 |
| 2015/0199636 A1 | 7/2015 | Gil et al. | |
| 2015/0199638 A1 | 7/2015 | Gil | |
| 2015/0199697 A1 | 7/2015 | Handley | |
| 2015/0262110 A1* | 9/2015 | Henriques | G06Q 50/06 705/7.14 |
| 2016/0093119 A1* | 3/2016 | Ahn | G07C 5/006 701/29.3 |
| 2016/0156652 A1 | 6/2016 | Paffenroth et al. | |
| 2016/0189540 A1* | 6/2016 | Fowe | G08G 1/096775 701/70 |
| 2016/0239752 A1* | 8/2016 | Wang | G06F 17/30044 |

OTHER PUBLICATIONS

Berkow et al., (2009) "Beyond Generating Transit Performance Measures: Visualizations and Statistical Analysis Using Historical Data", Transportation Research Record (2111), 158-168.

H. Chen, Principal Component Analysis with Missing Data and Outliers, Electrical and Computer Engineering Department, Rutgers University.

Hubert et al., ROBPCA: A New Approach to Robust Principal Component Analysis, American Statistical Association and the American Society for Quality, TECHNOMETRICS, Feb. 2005, vol. 47, No. 1, pp. 64-79.

A Guidebook for Developing a Transit Performance-Measurement System, Transit Cooperative Research Program Report 88, 2003, Chapter 4, pp. 110-118.

Mandelzys et al., "Automatically Identifying the Causes of Bus Transit Schedule Adherence Performance Issues Using AVL/APC Archived Data", Nov. 3, 2009, Transportation Research Record: Journal of the Transportation Research Board, vol. No. 2143, published by National Academies, Washington, D.C. pp. 9-15.

Standard Deviation Formulas, accessed at: https://www.mathsisfun.com/data/standard-deviation-formulas.html, last accessed May 20, 2015.

Strathman et al., "Empirical Analysis of Bus Transit On-Time Performance", May 1992, Transportation Research A, V. 27A, pp. 93-100.

Washington et al., "Count Data Models", Statistical and Econometric Methods for Transportation Data Analysis, second Edition, Chapter 11, pp. 283-301, published by CRC Press, 2011 by Taylor & Francis Group, LLC.

Wickelmaier, "An Introduction to MDS" Aalborg University, Denmark, May 4, 2003.

* cited by examiner

SYSTEM FOR PUBLIC TRANSIT INCIDENT RATE ANALYSIS AND DISPLAY

BACKGROUND

This disclosure relates to methods and systems for incident management and in particular to incident analysis and display in public transit networks.

Public transit systems experience a variety of incidents, such as passenger disturbances, vehicle collisions, etc., which negatively affect the service quality of the public transit network. Public transit agencies are always concerned about the perceived safety and reliability of their systems. Maintaining and growing ridership are constant struggles in many metropolitan areas. Operations managers desire the ability to quickly and accurately assess the state of their network with respect to incidents of all kinds. Although existing systems collect data regarding the incidents, they do not offer electronic display device or method for displaying to an operator the occurrence of incident in terms of space (such as routes) and time (such as operating hours) so that the operator can easily understand the correlation between an incident and space and time. As such, it is desirable to have a system that is able to analyze and display occurrences of incidents in a public transit network in terms of space and time. It is also desirable to have a system that is able to display future occurrences of incidents so that appropriate actions can be taken to reduce future incident rates in the public transit network.

This document describes devices and methods that are intended to address at least some issues discussed above and/or other issues.

SUMMARY

In one embodiment, an incident management system in a public transit network includes a processor and a computer readable medium containing a set of programming instructions that may cause the processor to receive public transit system incident data collected by one or more sensors of the public transit network, and cause an electronic display device to segment a display screen into multiple cells so that each of the cells corresponds a route segment and a time segment in which one or more vehicles of the public transit network traveled. The system may also determine a cumulative incident rate pertinent to each of the cells based on the incident data, and identify a linear model that includes a set of parameters indicative of effects of one or more route segments and one or more time segments on the cumulative incident rate. The system may use the linear model and the cumulative incident rate to estimate a future incident rate for each of the cells, and cause the electronic display device to output a graphical representation for each of the cells so that the graphical representation is indicative of the estimated future incident rate for the route segment and the time segment to which each cell corresponds.

In some embodiments, the system may have one or more sensors installed on a transportation vehicle in the public transit network, such as an audio sensor system that can be configured to receive a spoken report of an incident from a driver of the transportation vehicle, or an audio and/or video sensor that can be configured to capture audio and/or video signals and detect a disturbance on the transportation vehicle based on the captured audio and/or video signals. The system may include an accelerometer that can be configured to record a harsh braking or abnormal acceleration of the transportation vehicle, or a lifting equipment sensor that can be configured to record information indicative using of a lifting device on the transportation vehicle. The system may also include one or more electrical sensors that can be configured to record information indicative a breakdown of the transportation vehicle.

In determining the cumulative incident rate pertinent to each of the cells, the system may determine a cumulative incident count representing incidents that occurred to selected transportation vehicles in the public transit network that have traveled during the route segment and the time segment to which that cell corresponds, and then determine the cumulative incident rate based on the cumulative incident count and a number of passengers riding the selected transportation vehicles during the route segment and the time segment to which that cell corresponds.

In estimating the future incident rate for each cell, the system may calculate a sum of parameters for multiple route segments and multiple time segments, where each of the parameters is one of the set of parameters of the linear model that corresponds to the route segment or the time segment to which the cell is pertinent. Then the system may determine the estimated future incident rate based on the calculated sum.

In one embodiment, the system may determine the set of parameters of the linear model through a training process, in which the system may receive incident data from one or more sensors as training data, the incident data representing a cumulative incident rate pertinent to a route segment and a time segment, in which one or more transportation vehicles in the public transit network have traveled. Then, the system may apply linear regression to the training data to determine the set of parameters.

In outputting the graphical representation for each cell, in one embodiment, the system may use a color scale in a heatmap for each cell. Additionally, the system may output the graphical representation for each cell to indicate a cumulative incident count representing incidents that occurred to selected transportation vehicles in the public transit network that have traveled during the route segment and time segment to which the cell corresponds, or an incident rate that is pertinent to the route segment and the time segment to which the cell corresponds.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Each of the terms "camera," "video capture module," "imaging device," "image sensing device" or "imaging sensor" refers to a software application and/or the image sensing hardware of an electronic device that is capable of optically viewing a scene and converting an interpretation of that scene into electronic signals so that the interpretation is saved to a digital video file comprising a series of images.

The term "public transit network" or "public transit system" refers to a system or network that includes a plurality of transit stops, at which passengers may board or disembark. For example, the public transit network may include bus transportation, train transportation, ferry service, shuttle service, and/or air transportation. A vehicle in the public transit network may include rail, bus, paratransit access line (PAL) or other public transit means. The transit stop may be a bus stop, a train station or stop, a shuttle stop, or any other designated location where a public transit vehicle picks up passengers. The public transit system may or may not charge a passenger a fare for riding the system.

Figure 1:
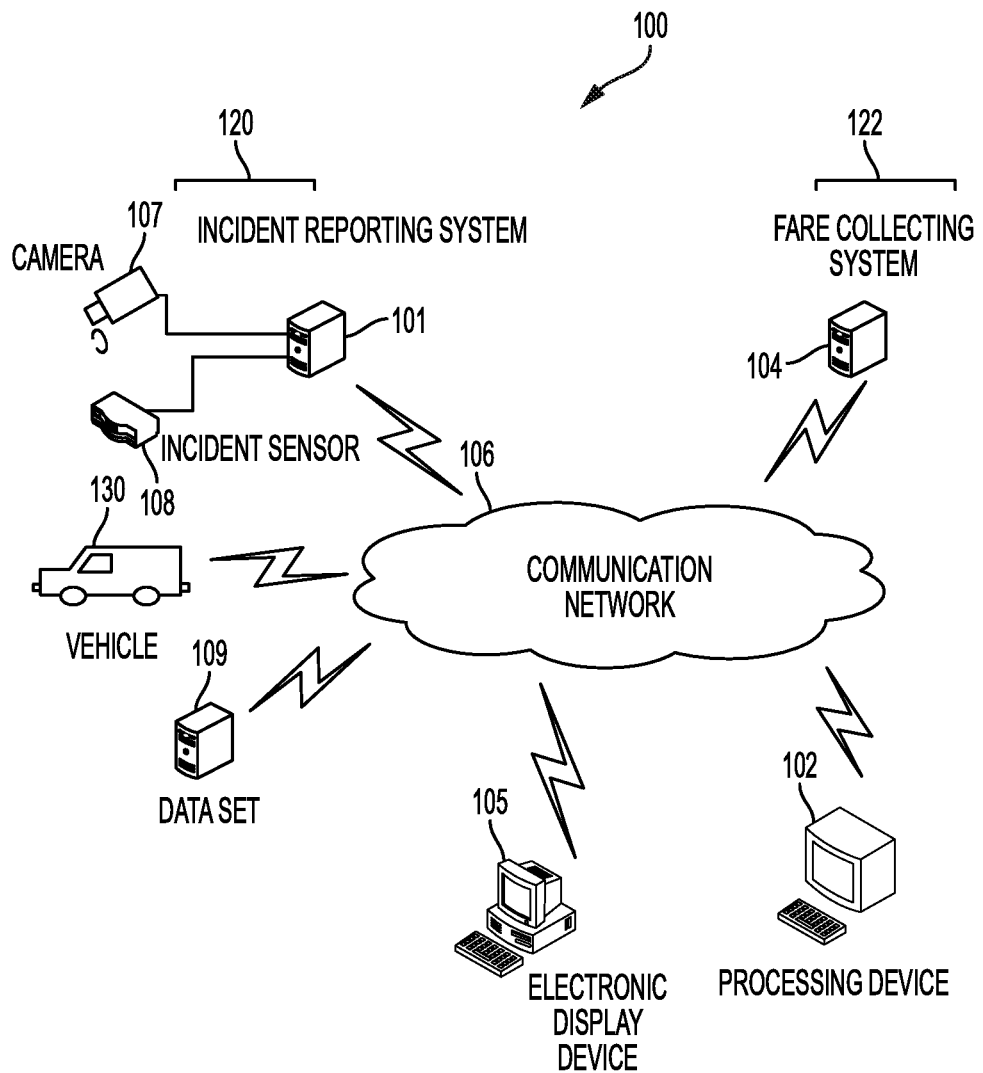
FIG. 1 depicts an example of an incident management system in a public transit network according to an embodiment.

With reference to FIG. 1, a system 100 in a public transit network includes one or more incident reporting systems 101. The incident reporting system is a device that includes hardware and software or firmware that can be configured to read sensor information about incidents that have occurred in the public transit network. The incident reporting system 101 may also be communicatively connected to the communication network 106 and configured to receive any information from the communication network about incidents in the public transit network. The incident reporting system can be installed anywhere on the network such as an operation facility 120 of a public transit system or onboard a vehicle itself.

An incident in a public transit network may include various events that may happen to a transportation vehicle in the transit network, such as disturbances on the vehicle, operational issues of the vehicle, or mechanical problems of the vehicle. Examples of disturbances on a vehicle may include harsh braking, abnormal acceleration, abnormal sharp turns, or frequent bumps occurred to the vehicle while traveling. Examples of operational issues of a vehicle may include a use of the vehicle that has required additional time for a particular stop of the vehicle such as use of onboard lifting device, e.g., a wheelchair lifting device, a bike rack, a roof rack on top of the vehicle, a roof ladder of a utility vehicle, or a ski rack. Operational issues of the vehicle may also include a deviation of the vehicle from its normal route. For example, an operational incident of concern is one bus passing another on a trip ("a pass up"). This is an indication of a scheduling problem where one bus keeps stopping to handle the passenger load, and another bus on the route passes by with few passengers. Transit system operators desire that buses carry substantially equal loads as much as possible. Examples of mechanical problems of a vehicle may include break down of the vehicle or other mechanical warning or failures related to engine, transmission, brake system, fuel line, exhaust, lighting, heating and cooling system. An incident may also include events that have occurred external to the vehicle, such as collisions, accidents, traffic jam on the route in which the vehicle is traveling, which may cause delay to the vehicle.

The incident reporting system 101 may include a camera 107 positioned along a route in the public transit system, facing towards the road and configured to monitor the road and traffic conditions. The camera 107 may also be installed on a transportation vehicle and configured to monitor either the interior of the vehicle or the road or surroundings outside the vehicle. The incident reporting system 101 may also include one or more incident sensors 108 that are configured to monitor various types of incidents aforementioned. The incident reporting system 101 may be installed on a vehicle 130 in the public transit network. The incident reporting system 101 may also be installed at or near a transit stop, a service station, or at a place or remote location along a route in the public transit network.

Figure 2:
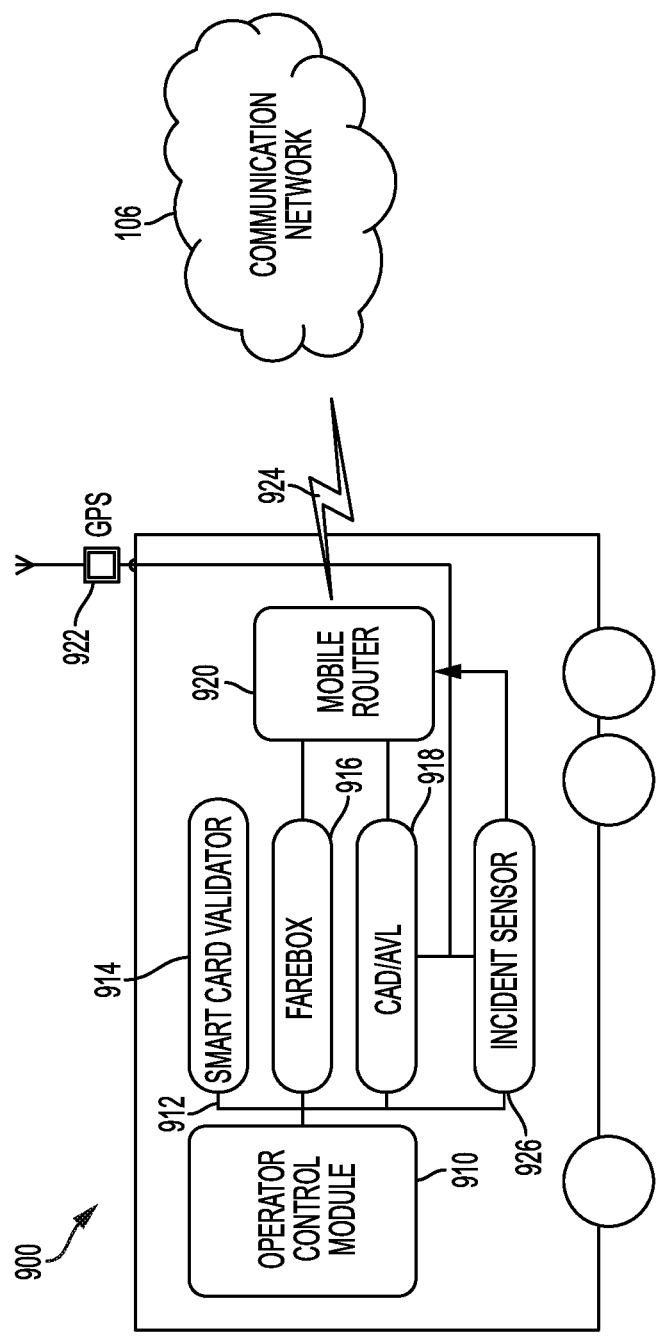
FIG. 2 depicts a diagram of a vehicle having an incident reporting system onboard according to an embodiment.

In FIG. 2, in one embodiment, the incident reporting system may be installed on the vehicle 900. The incident reporting system may include one or more types of incident sensors 926. For example, the incident reporting system may include an audio sensor system which is configured to receive a spoken report of an incident from a driver of the transportation vehicle. A processing device of the incident reporting system or a processing device of the incident management system (100 in FIG. 1) may use any now or hereafter known speech recognition techniques to convert the spoken report into a digital document, such as a text document file. In another example, the incident sensor may include a global positioning system (GPS) sensor 922 installable on a transportation vehicle 900 and configured to collect GPS position of the transportation vehicle and monitor when the vehicle is deviated from its predetermined route. The incident sensors may also include a clock usable to detect a time when the incident occurred, an accelerometer sensor configured to record a harsh braking or abnormal acceleration of the transportation vehicle, and/or a shock sensor configured to record road bumps occurred to the vehicle. The incident sensor may also include a lifting equipment usage sensor installable on the transportation vehicle and configured to record information indicative using of a lifting device on the transportation vehicle, e.g. a wheelchair ramp, where such use thereof can require additional time for a particular stop of the transportation vehicle that may affect the schedule of subsequent stops.

In other non-limiting examples, the incident reporting system may also have one or more electrical sensors installable on a transportation vehicle and configured to record information indicative any issues or warnings related to the operation of the vehicle, such as breakdown of the transportation vehicle, an engine problem, a transmission problem, a fuel problem, an electrical problem, a lighting problem, a heating and/or a cooling problem. The sensors may also include audio and video sensors installable on a transportation vehicle and configured to automatically detect passenger disturbances through capturing audio and video signals and analyzing those signals. For example, the system may use audio and/or sensors to capture in real-time shouting or yelling, or detect a passenger running or acting bizarrely.

Alternatively, and/or additionally, the vehicle, such as 900 in FIG. 2, may include a smart card validator 914 and/or a fare box 916 for receiving cash or fare information from a passenger. The vehicle may also include a computer-aided dispatch/automatic vehicle location system 918 that uses the GPS receiver 922 to determine the location of the vehicle and correlate the location of the vehicle to the payment received by the smart card validator or fare box.

Incident information gathered from sensors on the vehicle, as well as fare information and other information associated with the payment can be transmitted to the communication network 106 through a wireless router 920 and a communication link 924 such as a 2G, 3G, 4G or later known cellular network, a Wi-Fi network or any communication network such as a two-way radio system that enables voice and data communications. In addition, the vehicle may also include an operator control module 910 that allows the vehicle operator to intervene the incident reporting process or fare collection process as needed. For example, the operator control module 910 may be configured to allow the driver to notify the system of a false report of an incident or notify the system of an emergency stop so that the system may correct the incident information or suspend fare collection during the time of emergency.

In some embodiments, the incident reporting system, whether installed on a vehicle or elsewhere on the public transit network, may also have communication sensors e.g. routers, mobile devices, radio frequency (RF) based communication devices or software sensors, e.g. software applications, that are configured to receive incident data from a communication network or receive crowd sourced data about road and traffic conditions from the cloud. Examples of incident data received via the communication sensors may include collisions, accidents, traffic delays, constructions, emergency road closings or delays along the route in which selected transportation vehicles in the public transit network travel.

Returning to FIG. 1, the system 100 may also include one or more fare collection systems 104. The fare collection system is a device or set of devices that include hardware and software or firmware that can be configured to read or receive a fare from passengers who are boarding or getting off a vehicle at a transit stop and who bear a medium, collect a fare from the medium, and apply the fare to pay for passengers' usage of a public transit system. Examples of fare collection systems include card reading devices and other token reading devices, cash collection devices with money slots and/or coin slots, and the like, each of which may include or be communicatively connected to one or more processors. The fare collection system can be installed at an entrance or exit of the stop 122, or at the embarking or disembarking area of the stop, on the vehicle itself, or at another suitable location. The fare collection system may be communicatively connected to a communication network 106 to be able to send the fare information to or receive commands from other devices on the communication network.

The system 100 may also include a processing device 102 and a non-transitory, computer readable medium containing programming instructions that enable the processing device to receive data from the incident reporting system 101 via the communication network 106, wired or wirelessly, analyze the data and generate a graphic representation of incidents on one or more electronic display devices 105, which will be further described in detail with reference to FIG. 3. The electronic display may include a tablet, a phone, an in-vehicle display for the driver or any mobile data terminal that is capable of display contents or graphic representations on a screen.

Figure 3:
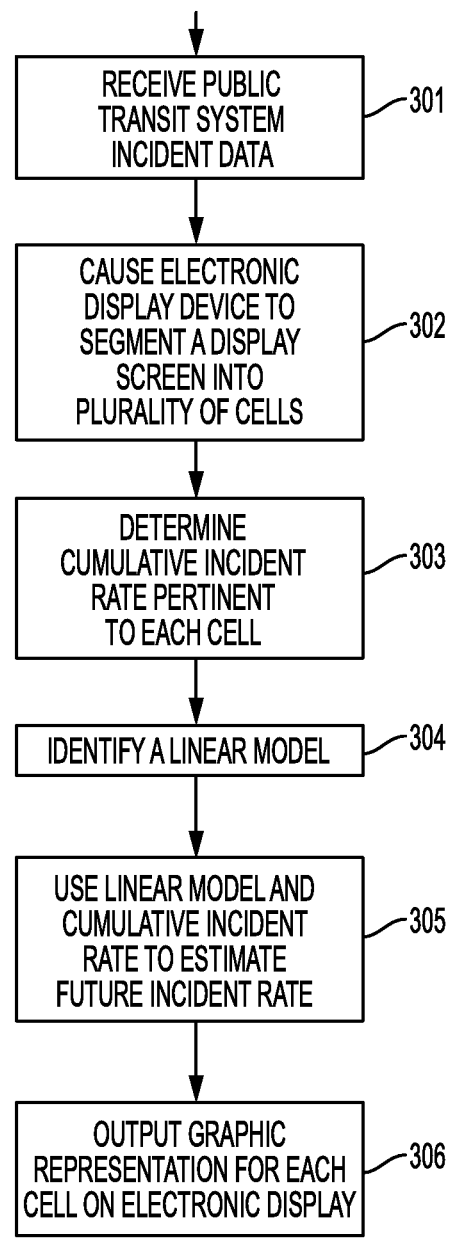
FIG. 3 depicts a diagram of a process for generating graphic representations on an electronic display device of an incident management system in a public transit network according to an embodiment.

In FIG. 3, in one embodiment, the system may receive public transit system incident data 301 from one or more incident reporting systems, cause the electronic display device to segment a display screen into plurality of cells 302, such as a heatmap, determine cumulative incident rates pertinent to each cell 303, identify a linear model indicative of effect of time and route segments on incident rates 304, use the linear model and cumulative incident rates to estimate future incident rate 305, and output a graphic representation for each cell on the electronic display 306.

An incident may occur during a route segment and/or time segment in the public transit network. A route segment may refer to a route traveled by one transportation vehicle or multiple transportation vehicles on the public transit network, and it may be any route or a portion of a route in the public transit network. For example, a route segment can be "Route 1," "Route 45" or "Route 1-Inbound," "Route 1-Outbound." A time segment refers to any time period in which a transportation vehicle in the public transit network travels. For example, a time segment can be the days of the week, such as "Monday," "Tuesday," or the time of the day, such as "morning," "midday," "evening," and "night." Since the incident data may be related to various route and time segments in the public transit network, it would be difficult to present these incident data intuitively to a user. Therefore, it may be advantageous for a system to provide an intuitive graphic representation of incident data with respect to the various time and route segments in the transit network, so that any time and route segment that is incident-prone can be readily viewable to an operator or a user.

Figure 4:
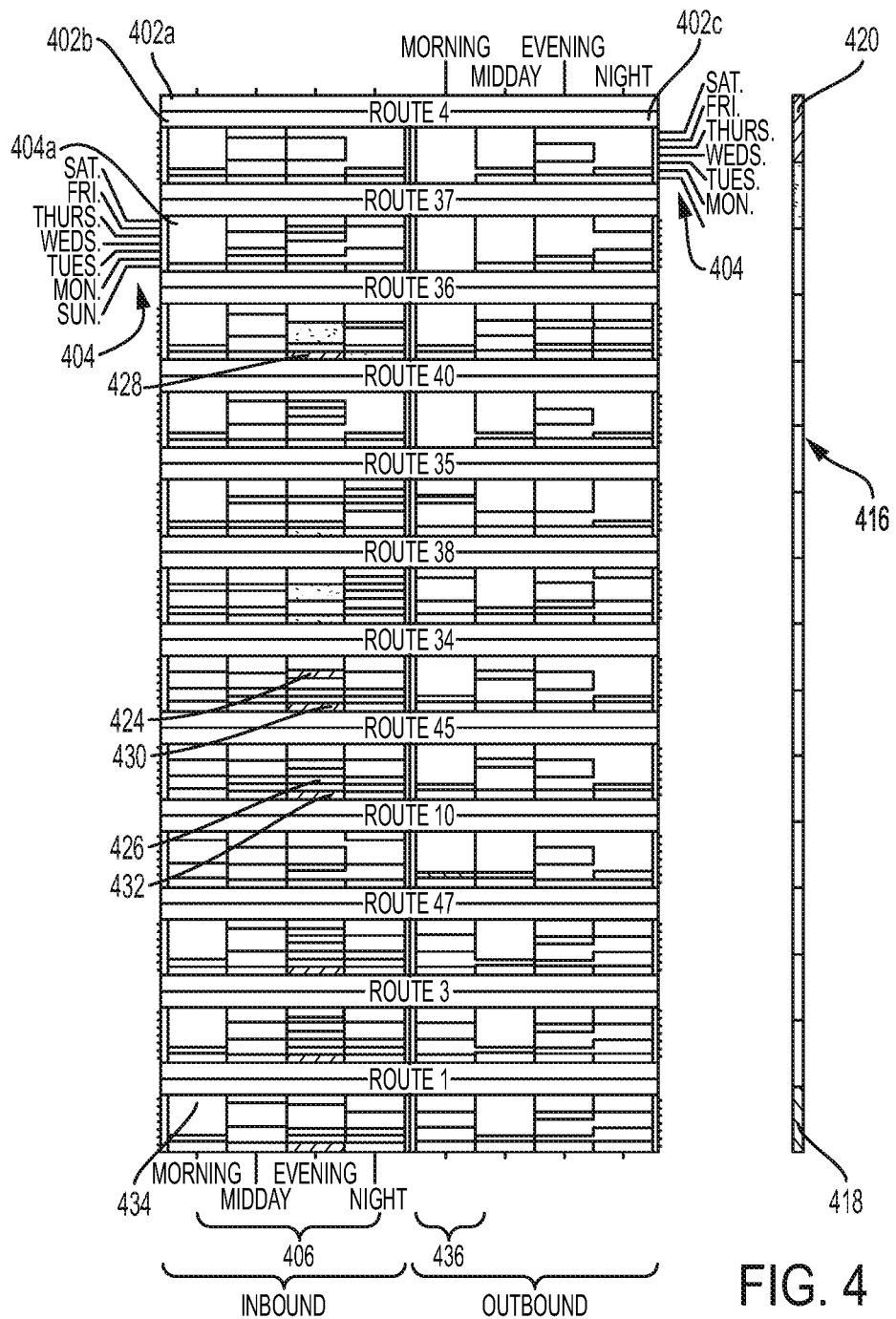
FIG. 4 depicts an example of a heatmap showing estimated future incident rates for each time and route of a public transit network according to an embodiment.

One type of graphic representation that can be used for displaying incident data is a heatmap, as shown in FIG. 4. A heatmap may include multiple cells, such as 424-434. Each cell represents an estimated future incident rate pertinent to the time and route segments in which that cell corresponds to. For example, cell 426 corresponds to a graphic representation indicative of incident rate on Wednesday evening along inbound of Route 45. Cell 434 corresponds to a graphic representation indicative of incident rate on Sunday morning along inbound of Route 1.

In one embodiment, the graphical representation for each cell can be shown in a color that the system selects from a color scale 416. The color scale 416 may be a set of color values that have a low end 418 representing a lowest value of the incident rate and an opposing high end 420 representing a highest value of the incident rate, where the color scale includes a number of colors and/or illuminations to indicate different values between the lowest value and the highest value. The system may automatically determine the number of colors in the color scale, where each color in the color scale corresponds to a threshold and represents an incident rate that is above the threshold. The system may also prompt a user to customize or adjust the color scale.

Returning to FIG. 3, in determining the cumulative incident rate pertinent to each cell 303, the system determines from the incident data that are reported by one or more incident reporting systems a cumulative incident count for each time segment and route segment of the public transit network and compute the cumulative incident rate as the cumulative incident count per ridership. For example, the cumulative incident rate can be cumulative incident count per a number of passengers reported, e.g. per 10,000 passengers. In another example, the cumulative incident rate can be cumulative incident count per distance, e.g. the number of miles that the vehicles in the public transit network have traveled.

With further reference to FIG. 3, the system may estimate future incident rate based on the cumulative incident rate. In one embodiment, the system may identify a generalized linear model 304 which can be expressed as a loglinear model:

$$\log(\mu/t) = \alpha + \beta x \quad (1)$$

where $\mu/t$ denotes an estimated incident rate for future occurrence per ridership, e.g. per 10,000 passengers, x denotes a cumulative incident rate from incidents occurred in a given time segment and route segment in the public transit network, and $\alpha$ and $\beta$ are parameters of the linear model.

In Equation (1), the log of the expected rate is modeled as a linear combination of the cumulative incident rate x for a given time segment and route segment in the public transit network. The parameters $\alpha$ and $\beta$ can be obtained from training sample data using linear regression. The values of betas may be indicative of effects on incident rate in one or more route segments and one or more time segments, and can be estimated from the training data. For example, for each variable in the linear model, such as route, direction (e.g. inbound, outbound), weekday, time of day), the table of beta values are shown (all nonnegative) below in Table 1. In Table 1, the larger values represent larger effects on incident rate and the smaller values represent smaller effects on incident rate.

TABLE 1

Examples of beta values for the linear model.

| INDICATOR VARIABLE | BETA |
| --- | --- |
| Weekday = Sunday | 0.281 |
| Weekday = Monday | 0.000 |
| Weekday = Tuesday | 0.100 |
| Weekday = Wednesday | 0.170 |
| Weekday = Thursday | 0.213 |
| Weekday = Friday | 0.128 |
| Weekday = Saturday | 0.102 |
| Time of Day = morning | 0.000 |
| Time of Day = mid-day | 0.391 |
| Time of Day = evening | 0.805 |
| Time of Day = night | 0.693 |
| Direction = Inbound | 0.630 |
| Direction = Outbound | 0.000 |
| Route = 1 | 0.304 |
| Route = 3 | 0.295 |
| Route = 47 | 0.306 |
| Route = 10 | 0.000 |
| Route = 45 | 0.374 |
| Route = 34 | 0.376 |
| Route = 38 | 0.336 |
| Route = 35 | 0.245 |

TABLE 1-continued

Examples of beta values for the linear model.

| INDICATOR VARIABLE | BETA |
| --- | --- |
| Route = 40 | 0.027 |
| Route = 36 | 0.432 |
| Route = 37 | 0.124 |
| Route = 4 | 0.024 |

In one embodiment, the system may use the estimated parameters of the linear model to calculate an estimated future incident rate 305 for each cell on the electronic display. For example, for each of the cells that corresponds to a time and route segment on the public transit network, the system may plug in cumulative incident rate for that time and route segment into Equation (1) and determine an estimated incident rate $\mu/t$ which indicates the future incident rate for the given time and route segment. In one embodiment, given a cell corresponding to a time segment and a route segment, the system may calculate a sum of all beta values for the route segments and the time segments, wherein the beta value for each of the route segments or each of the time segments is one of the set of parameters of the linear model that corresponds to the route segment or the time segment to which the cell is pertinent. The system may determine the estimate incident rate based on the calculated sum of beta values.

In one non-limiting example, according to Table 1 above, the estimated incident rate for Sunday evening of inbound of Route 36, according to the table above, will be exp^(0.281+0.805+0.630+0.432), wherein exp is the mathematical constant that is the base of the natural logarithm (Euler's number) and appropriate betas are given for Sundays, evenings, inbound routes, and routes along Route 36.

The system may further output a graphic representation for each cell on the electronic display based on the estimated incident rate 306, for which the graphic representation may be a color from the color scale (416 in FIG. 4) that is selected based on the value of the estimated incident rate.

An example of the output graphic representation is shown in FIG. 4, in which the system segments a display screen of the electronic display device into multiple rows, such as 402a-402c, each row representing a route segment such as 402a (Route 4), or 402b (inbound of Route 4) or 402c (outbound of Route 4), or a time segment such as day of the week 404, e.g., 404a, Saturday (for inbound of Route 37). The system may further segment each row in the display screen into a multiple blocks, each block representing a time segment such as time of a day 406, e.g., morning, midday, evening, night or combination thereof.

With further reference to FIG. 4, in one embodiment, each block that divides the rows on the display is a cell that corresponds to an estimated incident rate for a given time segment and route segment on the public transit network. The graphic representation of each cell is color from a color scale 416, which has a low end 418 representing a lowest value of estimated incident rate and an opposing high end 420 representing a highest value of the estimated incident rate, and multiple colors or illuminations between the low end 418 and the high end 420. For example, cell 428 corresponds to Sunday evening of inbound of Route 36, and it has a color close to the high end 420 of the color scale, indicating that Sunday evening of inbound of Route 36 has a high incident rate, i.e., it is particularly incident-prone. Similarly, cell 430 (Sunday evening of inbound of Route 34) and cell 432 (Sunday evening of inbound of Route 45) are likely incident-prone. On the contrary, FIG. 4 shows that, in general, on the mornings of all outbound routes 436, the estimated incident rates are very low.

Figure 5:
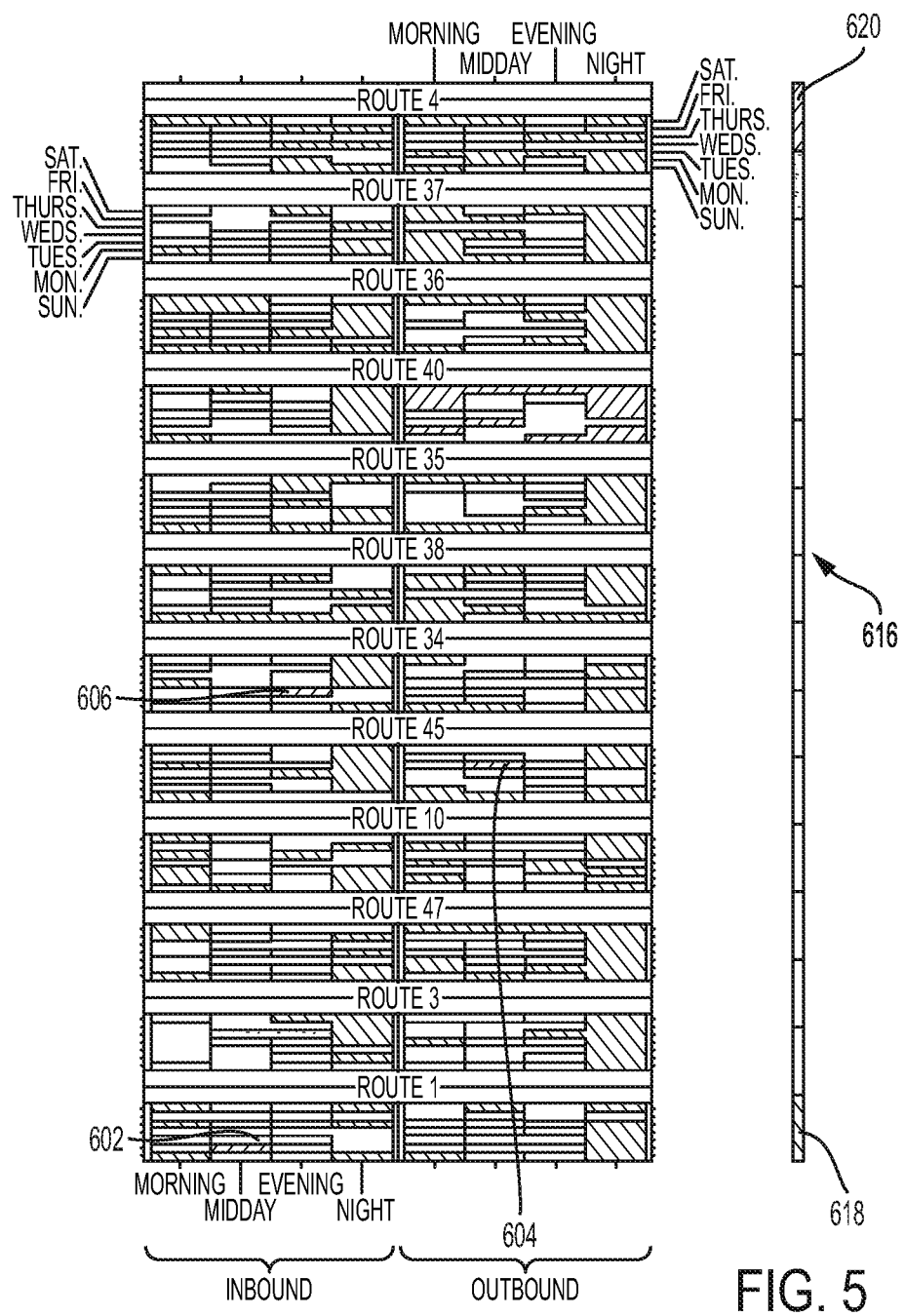
FIG. 5 depicts an example of a heatmap showing cumulative incident counts representing incidents that occurred to selected transportation vehicles that have traveled during a time and route in a public transit network according to an embodiment.

In some embodiments, such as shown in FIG. 5, the system may use similar heatmaps to output graphic representations for each cell on the electronic display, where each of the cells may indicate a cumulative incident count representing incidents that occurred to selected transportation vehicles in the public transit network that have traveled during the route segment and time segment to which the cell corresponds. For example, in FIG. 5, cells 604, 606 indicate high incident count in time and route segment, i.e. Thursday midday outbound of Route 45 (cell 604) and Tuesday evening inbound of Route 34 (cell 606). Similarly, cell 602 (Tuesday midday of inbound of Route 1) indicates low incident count.

Figure 6:
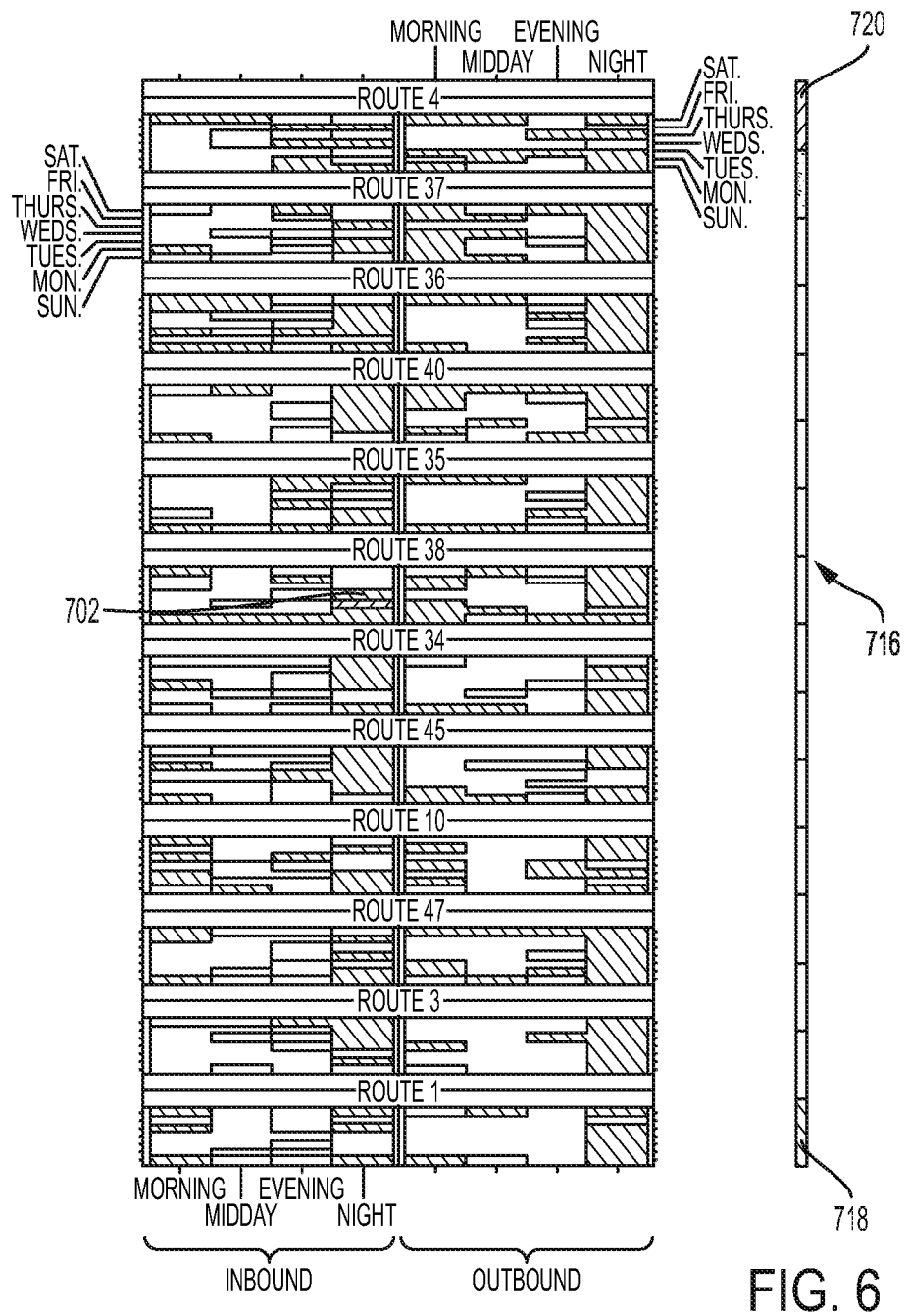
FIG. 6 depicts an example of a heatmap showing cumulative incident rates pertaining to selected transportation vehicles that have traveled during a time and route in a public transit network according to an embodiment.

Alternatively, and/or additionally, as shown in FIG. 6, the system may use similar heatmaps to output graphic representations for each cell on the electronic display, where each of the cells may indicate a cumulative incident rate per ridership (such as per 10,000 passengers) that occurred to selected transportation vehicles in the public transit network that have traveled during the route segment and time segment to which the cell corresponds. For example, in FIG. 6, cell 702 (Tuesday night inbound of Route 38) indicates high incident rate, while this cell does not show high incident count in the heatmap in FIG. 5. As such, various graphic representations for the same cell may provide the user with an intuitive understanding of the incident behavior of the public transit network, whether it is cumulative incident count, cumulative incident rate or estimate of future incident rate.

As illustrated in various embodiments above, various heatmaps may show different aspects of incidents in a public transit network such as cumulative incident count, cumulative incident rate and estimated incident rate of future occurrence. These illustrated embodiments provide the advantages over prior art in that the system segments a display screen of an electronic display device into multiple cells, where each cell may correspond to a particular time segment and/or route segment of the public transit network in which selected transportation vehicles travel. By generating a graphical representation for each cell, the system is able to show intuitively to the user which portion in the public transit network (in terms of time and route) is more incident-prone than others. The system is also able to estimate the incident rate of future occurrence and output graphic representations for all the cells on the display based on the estimated incident rate.

Figure 7:
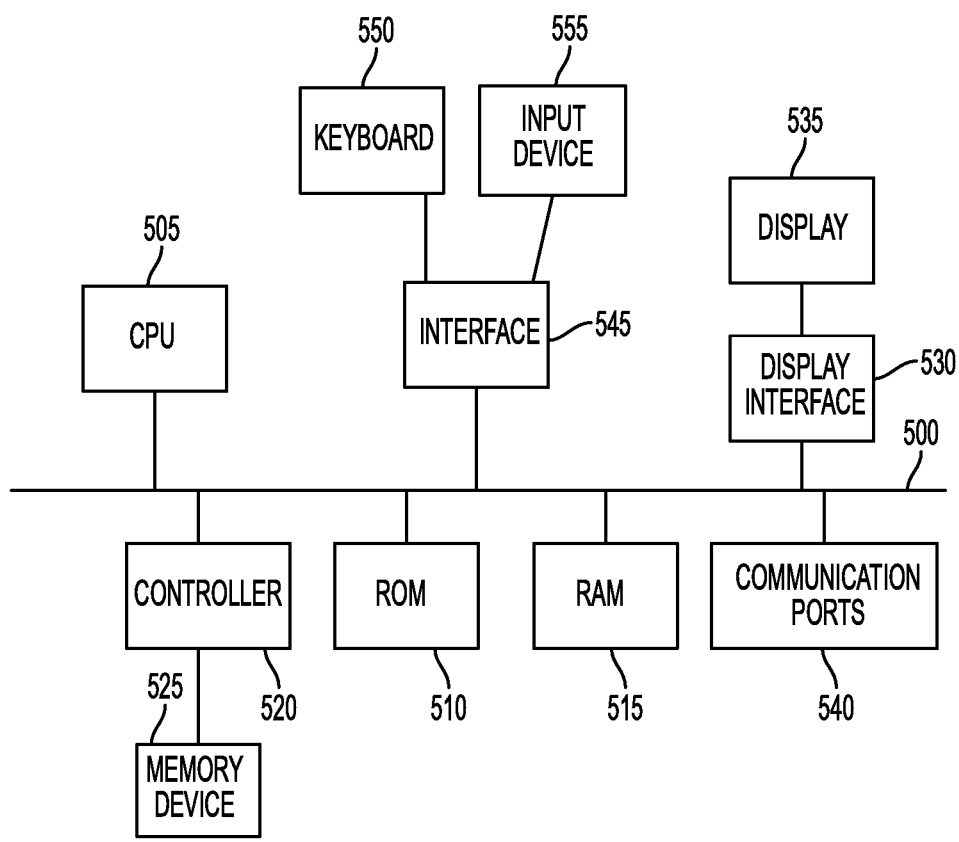
FIG. 7 depicts various embodiments of one or more electronic devices for implementing the various methods and processes described herein.

FIG. 7 depicts an example of internal hardware that may be included in any of the electronic components of the system, such as the processing device, the incident reporting system or the fare collection system in the embodiments described in FIGS. 1-3. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 525. A memory device, also referred to as a computer-readable medium, may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device and/or an audio input device. Digital image frames also may be received from an imaging capturing device 555 such as a video or camera positioned a stop in the public transit network. For example, the imaging capturing device may include imaging sensors installed in a fare collection system. A positional sensor and motion sensor may be included as input of the system to detect position and movement of passengers in the public transit network.

Optionally, the hardware may not need to include a memory, but instead programming instructions are running on one or more virtual machines or one or more containers on a cloud. For example, the processing device 102 (in FIG. 1) may be a server on a cloud that includes multiple virtual machines, each virtual machine having an OS, a virtual disk, virtual network and Apps, and the programming instructions for implementing various functions in the public transit network may be stored on one or more of those virtual machines on the cloud.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. An incident management system in a public transit network, comprising:
   a processor; and
   a computer readable medium containing a set of programming instructions configured to cause the processor to:
      receive public transit system incident data collected by one or more sensors of the public transit network;
      cause an electronic display device to segment a display screen into a plurality of cells so that each of the cells corresponds to one of a plurality of route segments and one of a plurality of time segments, so that each cell represents a portion of a route which one or more vehicles of the public transit network traveled over a period of time;
      determine, based on the incident data, a cumulative incident rate pertinent to each of the cells;
      identify a linear model comprising a set of parameters indicative of effects of one or more route segments and one or more time segments on the cumulative incident rate;
      use the linear model and the cumulative incident rate to estimate a future incident rate for each of the cells; and cause the electronic display device to output a graphical representation for each of the plurality of cells so that the graphical representation is indicative of the estimated future incident rate for the route segment and the time segment to which each cell corresponds.

2. The system of claim 1 further comprising the one or more sensors installed on a transportation vehicle in the public transit network.

3. The system of claim 1, wherein the programming instructions to determine the cumulative incident rate pertinent to each of the cells comprise programming instructions to:
   determine a cumulative incident count representing incidents that occurred to selected transportation vehicles in the public transit network that have traveled during the route segment and the time segment to which that cell corresponds; and
   determine the cumulative incident rate based on the cumulative incident count and a number of passengers riding the selected transportation vehicles during the route segment and the time segment to which that cell corresponds.

4. The system of claim 1, wherein the programming instructions for estimating the future incident rate comprise programming instructions configured to cause the processor to:
   for each of the cells:
      calculate a sum of parameters for the plurality of route segments and the plurality of time segments, wherein each of the parameters is one of the set of parameters of the linear model that corresponds to the route segment or the time segment to which the cell is pertinent, and
      determine the estimated future incident rate based on the calculated sum.

5. The system of claim 4, wherein the computer readable medium contains additional programming instructions configured to cause the processor to determine the set of parameters of the linear model by:
   receiving incident data from the one or more sensors as training data, the incident data representing a cumulative incident rate pertinent to a route segment and a time segment, in which one or more transportation vehicles in the public transit network have traveled; and
   applying linear regression to the training data to determine the set of parameters, wherein each parameter corresponds to a route segment or a time segment.

6. The system of claim 2, wherein the one or more sensors comprise:
   an audio sensor system configured to receive a spoken report of an incident from a driver of the transportation vehicle; or
   an audio and/or video sensor configured to capture audio and/or video signals and detect a disturbance on the transportation vehicle based on the captured audio and/or video signals.

7. The system of claim 2, wherein the one or more sensors also comprise an accelerometer configured to record a harsh braking or abnormal acceleration of the transportation vehicle.

8. The system of claim 2, wherein the one or more sensors also comprise a lifting equipment sensor configured to record information indicative using of a lifting device on the transportation vehicle.

9. The system of claim 2, wherein the one or more sensors also comprise one or more electrical sensors configured to record information indicative a breakdown of the transportation vehicle.

10. The system of claim 1, wherein the programming instructions for outputting the graphical representation for each cell comprise programming instructions to provide a heatmap by:
   identifying a color scale having a low end representing a lowest value of the future incident rate and an opposing high end representing a highest value of the future incident rate, wherein the color scale comprises a number of colors and/or illuminations to indicate different values; and
   causing the electronic display device to display each cell in the color scale based on the estimated future incident rate for the route segment and time segment to which each cell corresponds.

11. The system of claim 10, wherein the programming instructions for identifying the color scale comprises programming instructions configured to cause the processor to:
   automatically determine the number of colors in the color scale, each color in the color scale corresponding to a threshold and representing an incident rate that is above the threshold; or
   prompt a user to adjust the color scale.

12. The system of claim 1, wherein the programming instructions configured to cause the processor to cause the electronic display device to output the graphical representation for each of the plurality of cells on the display screen comprise instructions to make the graphical representation indicative of:
   a cumulative incident count representing incidents that occurred to selected transportation vehicles in the public transit network that have traveled during the route segment and time segment to which the cell corresponds; or
   an incident rate that is pertinent to the route segment and the time segment to which the cell corresponds.

13. A method of managing incidents in a public transit network, comprising:
   collecting, by one or more sensors in a public transit network, public transit system incident data;
   receiving, by a processor, public transit system incident data collected by the one or more sensors of the public transit network;
   causing, by the processor, an electronic display device to segment a display screen into a plurality of cells so that each of the cells corresponds to one of a plurality of route segments and one of a plurality of time segments, so that each cell represents a portion of a route which one or more vehicles of the public transit network traveled over a period of time;
   determining, by the processor, a cumulative incident rate pertinent to each of the cells based on the incident data;
   identifying, by the processor, a linear model comprising a set of parameters indicative of effects of one or more route segments and one or more time segments on the cumulative incident rate;
   by the processor, using the linear model and the cumulative incident rate to estimate a future incident rate for each of the cells; and
   causing, by the processor, the electronic display device to output a graphical representation for each of the plurality of cells so that the graphical representation is indicative of the estimated future incident rate for the route segment and the time segment to which each cell corresponds.

14. The method of claim 13, wherein determining the cumulative incident rate pertinent to each of the cells comprises:
   determining a cumulative incident count representing incidents that occurred to selected transportation vehicles in the public transit network that have traveled during the route segment and the time segment to which that cell corresponds; and
   determining the cumulative incident rate based on the cumulative incident count and a number of passengers riding the selected transportation vehicles during the route segment and the time segment to which that cell corresponds.

15. The method of claim 13, wherein estimating the future incident rate comprises, for each of the cells:
   calculating a sum of parameters for the plurality of route segments and the plurality of time segments, wherein each of the parameters is one of the set of parameters of the linear model that corresponds to the route segment or the time segment to which the cell is pertinent; and
   determining the estimated future incident rate based on the calculated sum.

16. The method of claim 15 further comprising determining the set of parameters of the linear model by:
   receiving incident data from the one or more sensors as training data, the incident data representing a cumulative incident rate pertinent to a route segment and a time segment, in which one or more transportation vehicles in the public transit network have traveled; and
   applying linear regression to the training data to determine the set of parameters, wherein each parameter corresponds to a route segment or a time segment.

17. The method of claim 13 further comprising:
   receiving, by the processor, via an audio sensor, a spoken report of an incident from a driver of a transportation vehicle; or
   capturing, by the processor, via an audio and/or video sensor, audio and/or video signals and detecting a disturbance on the transportation vehicle based on the captured audio and/or video signals.

18. The method of claim 13 further comprising:
   recording, by the processor, via an accelerometer, a harsh braking or abnormal acceleration of a transportation vehicle.

19. The method of claim 13 further comprising:
   recording, by the processor, via a lifting equipment sensor, information indicative using of a lifting device on a transportation vehicle.

20. The method of claim 13, wherein the one or more sensors also comprise one or more electrical sensors configured to record information indicative a breakdown of the transportation vehicle.

21. The method of claim 13, wherein outputting the graphical representation for each cell comprises providing a heatmap by:
   identifying a color scale having a low end representing a lowest value of the future incident rate and an opposing high end representing a highest value of the future incident rate, wherein the color scale comprises a number of colors and/or illuminations to indicate different values; and
   causing the electronic display device to display each cell in the color scale based on the estimated future incident rate for the route segment and time segment to which each cell corresponds.

22. The method of claim 21, wherein identifying the color scale comprises:
   automatically determining the number of colors in the color scale, each color in the color scale corresponding to a threshold and representing an incident rate that is above the threshold; or
   prompting a user to adjust the color scale.

23. The method of claim 13, wherein causing the electronic display device to output the graphical representation for each of the plurality of cells on the display screen comprises making the graphical representation indicative of:
   a cumulative incident count representing incidents that occurred to selected transportation vehicles in the public transit network that have traveled during the route segment and time segment to which the cell corresponds; or
   an incident rate that is pertinent to the route segment and the time segment to which the cell corresponds.

* * * * *